United States Patent [19]

Wilmsmann et al.

[11] 4,407,471
[45] Oct. 4, 1983

[54] CLAMPING DEVICE FOR SELF-SUPPORTING ELECTRIC CABLES

[75] Inventors: Hans-Peter Wilmsmann; Fritz E. Koch, both of Schalksmühle, Fed. Rep. of Germany

[73] Assignee: Dr. Franz & Rutenbeck, Schalksmühle, Fed. Rep. of Germany

[21] Appl. No.: 217,490

[22] Filed: Dec. 17, 1980

[51] Int. Cl.³ .............................................. F16L 3/00
[52] U.S. Cl. ................................. 248/63; 24/136 R; 174/79; 403/369
[58] Field of Search ..................... 403/374, 409, , 369, 403/368; 248/63, 58, 74 R, 317; 24/136 R, 136 K, 136 L, 115 M; 174/79

[56] References Cited

U.S. PATENT DOCUMENTS 1,642,243  9/1927  Hinzer .............................. 24/136 R
1,832,138  11/1931  Pounder .......................... 403/368 X

FOREIGN PATENT DOCUMENTS 620734  11/1962  Belgium ............................... 174/79
1074691  2/1960  Fed. Rep. of Germany ........ 174/79
2342524  3/1975  Fed. Rep. of Germany .
1233647  10/1960  France ................................. 174/79

Primary Examiner—William H. Schultz
Assistant Examiner—Ramón O. Ramírez
Attorney, Agent, or Firm—Karl F. Ross

[57] ABSTRACT

A support for electric cables, in instances where the configuration of the distribution system is not fixed, comprises a pair of cable-clamping members whose outer surfaces form wedges guided by a pair of converging flanges. The inner surfaces of these members clamp the point or region of a cable that is to be held fixed in space. A pair of outer clamping members surround the above flanges. Coupling formations ensure that all parts of the structure always stay in their proper relative positions, allowing but a widening or a narrowing of the cable-receiving cavity. The flanges have projections or abutments which enter into lateral elongated recesses of the cable-clamping members and thus limit the possible minimum and maximum spacing of the latter, which depends upon the size of the electric cable that is to be supported.

6 Claims, 5 Drawing Figures

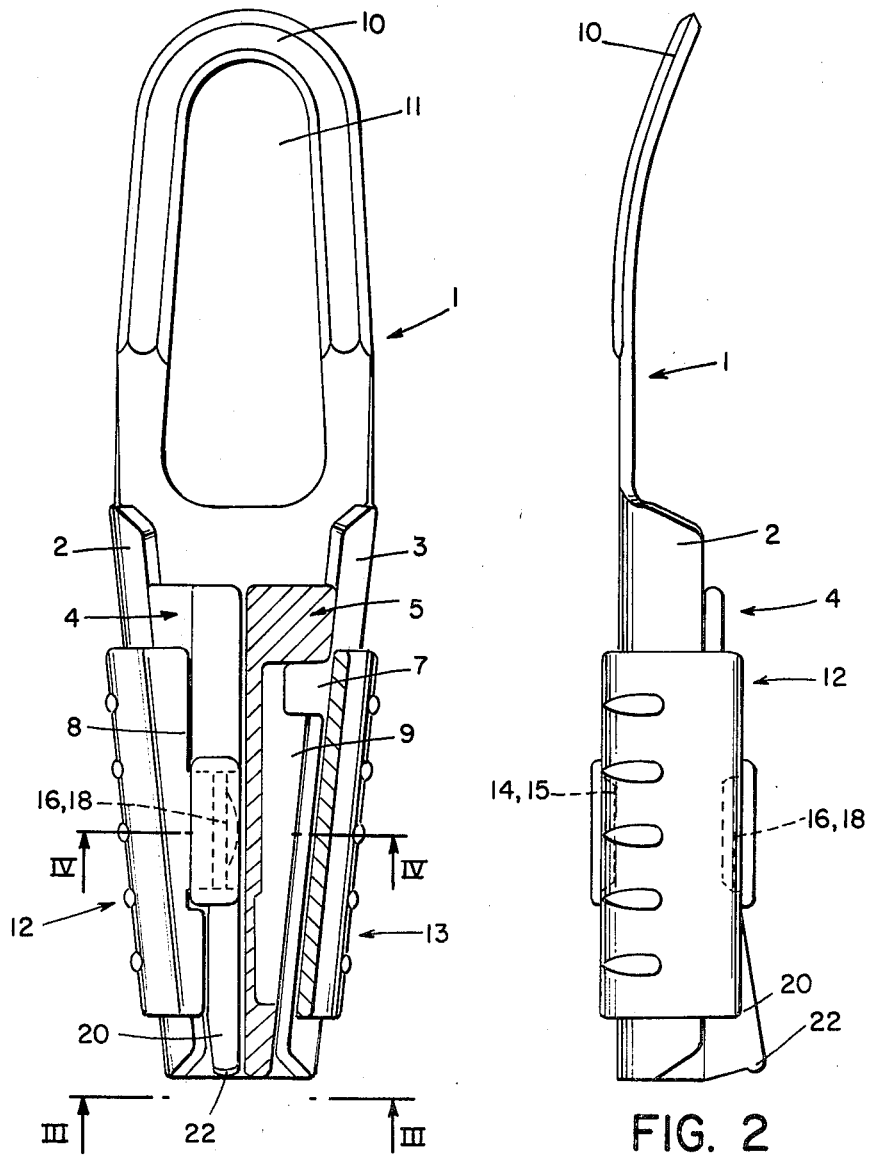

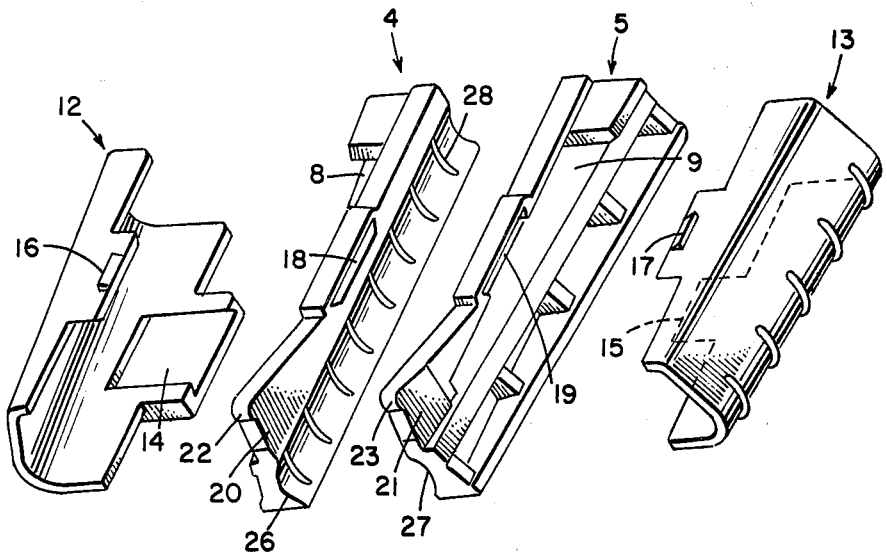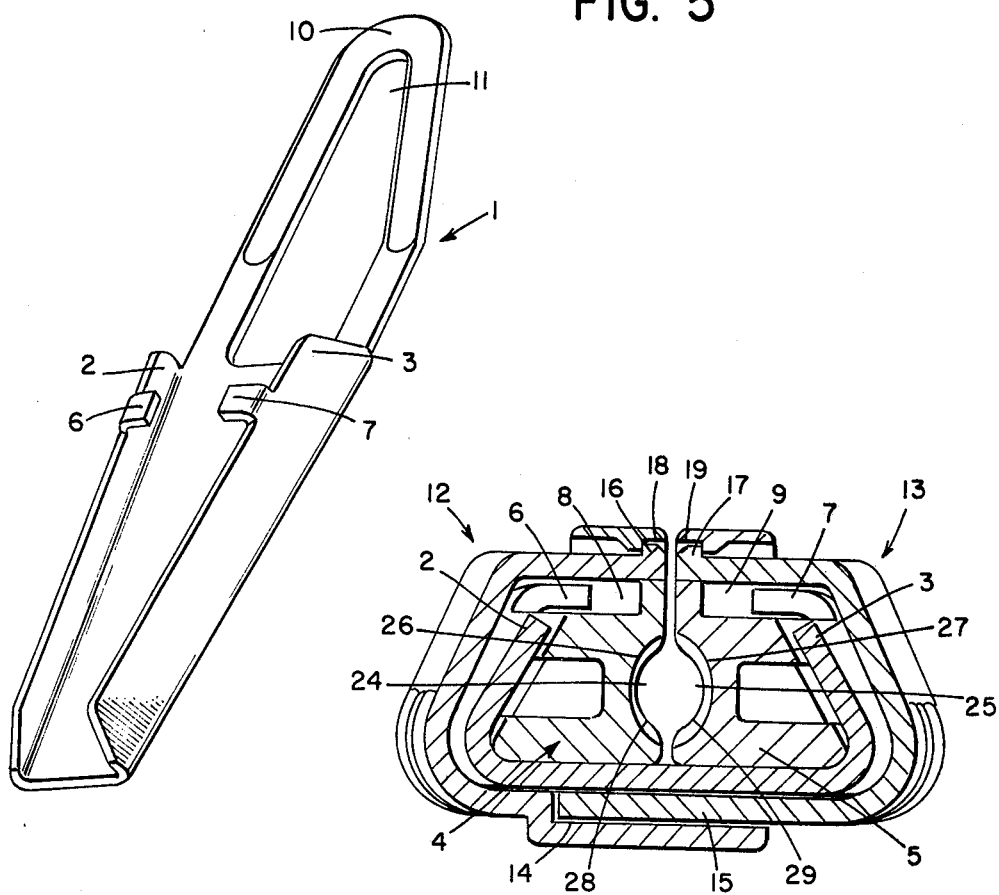

CLAMPING DEVICE FOR SELF-SUPPORTING ELECTRIC CABLES

FIELD AND BACKGROUND OF THE INVENTION

Our present invention relates to an improvement of supports for electric cables of the type described in German patent specification No. 23 42 524.

The common features of the device according to our present invention and the support known from the above-identified publication are as follows:

(a) a support member having an aperture allowing the support to be suspended;

(b) a pair of lateral flanges on that support member which include acute angles therewith and coverage in such a way that their spacing is largest adjacent the aperture and smallest remote from that aperture;

(c) a pair of cable-clamping members, each having an outer surface which is wedge-shaped and slidably engages the inner surface of one of the flanges and an inner surface adapted to exert a clamping action upon an electric cable;

(d) a pair of outer clamping members each engaging the outer surface of one of the flanges and slidable therealong;

(e) first cooperating tie means or coupling formations on each of the cable-clamping and outer clamping members for causing each cable-clamping member to move jointly with one of the outer clamping members along one of the lateral flanges; and (f) second cooperating tie means or coupling formations on the outer clamping members allowing to alter the transverse separation of the pair of outer clamping members.

OBJECT OF THE INVENTION

It is the general object of our invention to increase the cost-effectiveness of devices of the above description.

SUMMARY OF THE INVENTION

The novel features of our present invention include a pair of projections formed by the lateral flanges of the support member of which each engages a cooperating elongated lateral recess in one of the cable-clamping members, thus forming a pair of abutments which by their coaction with the walls of these recesses directly limit the maximum and the minimum separation of the pair of cable-clamping members.

BRIEF DESCRIPTION OF THE DRAWING

FIG. 1 is in part an elevational view of a cable-suspending device according to our present invention, taken along line I—I of FIG. 3;

FIG. 2 is a side elevation of a device according to FIG. 1;

FIG. 3 is an end view taken along line III—III of FIG. 1;

FIG. 4 is a section taken along line IV—IV of FIG. 1; and

FIG. 5 is an exploded isometric view of the components of our improved cable-suspending device.

DESCRIPTION OF PREFERRED EMBODIMENT

In the drawing, numeral 1 generally indicates a support member whose upper portion is slightly bent as shown in FIG. 2. Reference numeral 10 indicates the peak or apex portion of the support which defines a large aperture 11 designed to receive a hook or the like for the suspension of member 1. Reference numerals 2 and 3 indicate lateral flanges of support 1 which include acute angles with the back of the support. Parts 1, 2 and 3 are formed of a single piece of sheet metal, preferably sheet steel. Reference numerals 4 and 5 indicate a pair of inner cable clamps positioned inside the downwardly converging gap defined by lateral flanges 2 and 3. Cable clamps 4, 5 may be moved in upward or downward direction (as viewed in FIGS. 1 and 2) along flanges 2 and 3. FIG. 1 shows the cable clamps 4, 5 in lowest position in which the intervening gap is narrowest. The flanges have projections 6, 7 which enter into elongated slots or recesses 8, 9 of the inner clamping members 4, 5 and thus form guides for the latter. This has been shown in FIGS. 1 and 4. As shown in the right-hand portion of FIG. 1, projection 7 abuts against the upper wall of recess 9 of cable-clamping member 5 and thus determines the lowest position of the latter. The highest position of cable-clamping member 5 is determined by engagement of projection 7 with the lower boundary of recess 9.

Reference numerals 12 and 13 indicate a pair of outer clamping members that surround flanges 2, 3 and overlapping embrace the support 1 in a belt-like fashion. The metallic support 1 and its lateral flanges 2, 3 are arranged intermediate inner clamping members 4, 5 and outer clamping member 12, 13. As best seen in FIG. 5, outer clamping member 12 is provided with a rectangular recess 14 to be engaged by a rectangular tab 15 on outer clamping member 13. Tab 15 moves out of recess 14 when clamping members 4, 5 and 12, 13 are moved upwardly and moves into recess 14 when these two pairs of members are moved downwardly. It will be apparent that this movement of the clamping members 12, 13 changes their separation from each other. Interfitting formations 14, 15 are the second tie means referred to in the introductory portion of the present specification. The first tie means are other interfitting formations which will now be described. Outer clamping member 12 is provided with a tooth-like projection 16 adapted to enter a recess 18 in the inner clamping member 4, thus precluding a relative movement between these two clamping members. In a like fashion outer clamping member 13 is porvided with a tooth-like projection 17 adapted to enter a recess 19 in inner clamping member 5, thus precluding any relative movement therebetween.

A cable (not shown) is clamped in the tubular space or cavity defined by clamping members 4, 5. The thickness of the cable may vary between certain limits. In FIG. 4 reference numerals 24 and 25 indicate two more or less semicylindrical channels which may be referred to as cable beds and whose walls 26, 27 are provided with spaced semicircular ribs or projections 28, 29 (see also FIG. 5) designed to clamp cables of relatively small diameter. The width of the radially accwessible cavity between these ribs or projections accommodates cables of relatively large diameter.

The clamping action exerted by a device according to this invention requires considerable forces. Hence the inner clamping members 4, 5 are provided with projections 20, 21 ending in reinforced edges 22, 23 adapted to be acted upon by a hammer. This facilitates unclamping of a cable engaged by the device.

The outer surfaces of clamping members 12, 13 are provided with unnumbered ribs designed to facilitate the handling of the device.

From FIGS. 4 and 5 it will be apparent that flanges 2 and 3 are enclosed between the outer surfaces of clamping members 4, 5 and the inner surfaces of clamping members 12, 13. Since flanges 2, 3 converge but the confronting edges of clamping members 4, 5 should remain parallel during the upward and downward movement along flanges 2, 3, members 4, 5 are wedge-shaped. To be more specific, there ends situated near the aperture 11 are broader than their ends remote from that aperture so that their surfaces engaging the inner surfaces of flanges 2, 3 follow the convergence of these flange surfaces while their cable-engaging inner surfaces only shift transversely.

It will be apparent from the foregoing that when parts 4, 5 and 12, 13 are in their upper position, as viewed in FIGS. 1 and 2, the width of the cavity 24, 25 is directly determined by abutments 6, 7 of guide rails or flanges 2, 3 and the cooperating surfaces of cable-clamping members 4, 5. This allows to greatly reduce the manufacturing tolerances of the device. When the device carries a load, i.e. grips a cable, and with parts 4, 5 and 12, 13 in their lower position, the entire load is carried by abutments 6, 7 cooperating with abutments on parts 4, 5, and no stresses whatever are trasmitted to outer clamping members 12. 13. It will further be apparent from the foregoing that the clamping members 4, 5 and 12, 13 completely surround the lateral flanges 2, 3 and do not form any recesses into which a finger of a person operating the device may enter with resulting injury to that person. The projections 22, 23 on abutments 20, 21 serve the purpose of preventing a hammer from sliding off parts 20, 21 when removing a cable clamped between parts 4 and 5; this represents an additional safety feature.

Parts 4, 5 and 12, 13 are preferably made of a somewhat deformable plastic substance. This allows insertion of the wedge-shaped tie means 16, 17 into the co-acting coupling formations 18, 19 and a firm interconnection of parts 4, 12 and parts 5, 13, respectively. On the other hand, a considerable force is needed to separate these parts from each other.

As will be apparent from the foregoing, our invention aims at preventing the transmission of stresses from the cable to other parts where they may be harmful. Such stresses may be transmitted immediately to cable-clamping members 4, 5 and from there to flanges 2, 3. These stresses may be so large as to cause outward bending of flanges 2, 3 and separation of outer clamping members 12, 13. This situation has been recognized, but no effective solution to do away with it has been proposed as yet. Hence, out invention solves a long-standing need in the manufacture of clamping devices for self-suspended cables. This need is met, in essence, by defining exactly the travel of cable-clamping members 4, 5 relative to abutments 6, 7 provided for this purpose, so that the pull of a cable acting on members 4, 5 cannot move the latter beyond a predetermined safe position. If cable-clamping members 4, 5 are moved beyond that position, parts 2, 3 are bent and the cable is released from the safe clamping action of members 4, 5. Thus, our invention ultimately provides a load-limiting device.

We claim as our invention:

1. A support for electric cables comprising
    (a) a support member having an aperture allowing the support member to be suspended;
    (b) a pair of lateral flanges on said support member which include acute angles with said support member and converge in such a way that their spacing is largest adjacent said aperture and smallest remote from said aperture;
    (c) a pair of cable-clamping members each having an outer surface which is wedge-shaped and slidable engages the inner surface of one of said pair of flanges and an inner curved surface adapted to exert a clamping pressure upon an electric cable;
    (d) a pair of outer clamping members each engaging the outer surface of one of said pair of flanges and each slidable along one of said pair of flanges;
    (e) first cooperating tie means on each of said pair of cable-clamping members and on each of said pair of outer clamping members for causing each of said pair of cable-clamping members to move jointly with one of said pair of outer clamping members along one of said pair of lateral flanges;
    (f) second cooperating tie means on the rear of said pair of outer clamping members allowing to alter the spacing between said pair of outer clamping members; and
    (g) a pair of projections formed by said lateral flanges of said support member of which each engages a cooperating elongated lateral recess in one of said pair of cable-clamping members, thus forming a pair of cooperating abutments with the walls of said recess that directly limit the maximal and the minimal separation of said pair of cable-clamping members.

2. A support for electric cables as specified in claim 1 wherein said pair of projections formed by said pair of lateral flanges of said support member are entirely encapsulated by said pair of cable-clamping members and said pair of outer clamping members.

3. A support for electric cables as specified in claim 1 wherein
    (a) said first tie means are formed by a pair of recesses in said cable clamping members arranged near the centers thereof, each engaged by a projection integral with one of said pair of outer clamping members; and wherein said
    (b) second tie means are formed by a pair of rectangular plate members arranged near the centers of and integral with one of said pair of outer clamping members, each of said pair of plate members having cooperating linear edges to compel relative linear movements of said pair of outer clamping members.

4. A support as specified in claim 1 wherein each of said pair of cable-clamping members defines a cable-receiving channel of substantially semicircular cross-section which has inwardly projecting ribs, the diameter of the channel determining the largest diameter of the electric cable adapted to be supported, and the diameter of said ribs determining the smallest diameter of the electric cable adapted to be supported.

5. A support as specified in claim 1 wherein the aperture in said support member extends substantially to said pair of lateral flanges thereof.

6. In a clamping device for self-supporting electric cables including
    (a) an elongated substantially flat metallic support member having a plane of symmetry, said support member comprising an apertured upper portion and a lower portion, said lower portion having a pair of lateral flanges bent out of the plane defined by said lower portion and converging in a direction longitudinally of said support member from said upper portion to said lower portion;

(b) a pair of elongated cable-clamping members each arranged on opposite side of said plane of symmetry, said pair of cable-clamping members having juxtaposed cable-clamping surfaces and defining therebetween a radially accessible cable-receiving cavity;

(c) each of said pair of cable-clamping members further including an inclined wedge surface slidably engaged by one of said pair of flanges to vary the width of said cable-receiving cavity as said pair of cable-clamping members is moved with said wedge surface past said pair of flanges;

(d) a pair of outer clamping members each engaging and embracing the outer surface of one of said pair of flanges while being slidable along one of said pair of flanges and extending over a rear surface of said support member;

(e) a pair of first coupling formations each connecting one point of one of said pair of cable-clamping members to one point of said pair of outer clamping members;

(f) a pair of second coupling formations arranged on the rear of said support member, said second pair of coupling formations being respectively provided on said pair of outer clamping members and arranged to interfit in a direction transversely to said plane of symmetry:

the improvement comprising (g) a pair of lateral recesses one in each of said pair of cable-clamping members, and (h) a pair of projections formed by said pair of flanges of said support member extending into said recesses and establishing jointly with the walls of said pair of recesses limiting positions for said pair of cable-clamping members.

* * * * *